United States Patent [19]
Davis et al.

[11] Patent Number: 5,168,294
[45] Date of Patent: Dec. 1, 1992

[54] DISPLAY DEMONSTRATION SYSTEM FOR PROVIDING ENLARGED PROJECTED IMAGE OF CALCULATOR DISPLAY

[75] Inventors: Peter H. Davis, Dallas; Brad V. Christensen, Plano; Robert R. Ahlfinger, Waxahachie, all of Tex.

[73] Assignee: Texas Instruments Incorporated, Dallas, Tex.

[21] Appl. No.: 769,159

[22] Filed: Sep. 27, 1991

Related U.S. Application Data

[63] Continuation of Ser. No. 579,432, Sep. 7, 1990, abandoned.

[51] Int. Cl.⁵ .................. G09B 23/02; G03B 21/14
[52] U.S. Cl. ............................ 353/122; 353/97; 353/56; 353/DIG. 5; 434/365
[58] Field of Search ............ 353/122, 97, 65, 63, 353/56, DIG. 3, DIG. 5, DIG. 6; 340/711, 712; 364/518; 434/365

[56] References Cited

U.S. PATENT DOCUMENTS

| | | | |
|---|---|---|---|
| 4,259,668 | 3/1981 | Nishimura et al. | 340/711 |
| 4,728,184 | 3/1988 | Kyhl | 353/DIG. 5 |
| 4,836,786 | 6/1989 | Wong | 353/DIG. 3 |
| 4,846,694 | 7/1989 | Erhardt | 353/DIG. 3 |
| 4,921,343 | 5/1990 | Ushiro et al. | 353/DIG. 3 |
| 4,944,578 | 7/1990 | Denison | 350/333 |
| 4,953,971 | 9/1990 | Highfill | 353/DIG. 5 |
| 5,035,502 | 6/1991 | Stokes | 353/122 |
| 5,041,965 | 8/1991 | Chen | 353/122 |

FOREIGN PATENT DOCUMENTS 3711541 10/1988 Fed. Rep. of Germany ...... 353/122

OTHER PUBLICATIONS

Walter C. Connolly, "Apparatus for Teaching Physics", The Physics Teacher, Sep. 1985, pp. 382-383.

Primary Examiner—Allan N. Shoap
Assistant Examiner—William C. Dowling
Attorney, Agent, or Firm—William E. Hiller; Richard L. Donaldson

[57] ABSTRACT

A calculator (20) or other computing device uses a remote display (22) set upon an elevated platform (26) above the base (12) of an overhead projector (10). Light through the base lens (14) is passed through the display (22) and is enlarged by lens (30).

8 Claims, 1 Drawing Sheet

5,168,294

DISPLAY DEMONSTRATION SYSTEM FOR PROVIDING ENLARGED PROJECTED IMAGE OF CALCULATOR DISPLAY

This application is a continuation of application Ser. No. 579,432 filed Sep. 7, 1990 now abandoned.

TECHNICAL FIELD OF THE INVENTION

This invention relates in general to a display demonstration system for providing an enlarged projected image of the display of an electronic data processing apparatus, and more particularly to such a display demonstration system for providing an enlarged projected image of a calculator display for viewing in a classroom environment or the like.

BACKGROUND OF THE INVENTION

In many situations, it is desirable to project the display of a calculator or computer onto a large screen for group viewing. In particular, it is often desirable for a teacher to operate a computing device while the display is projected onto a large screen for viewing by the entire class. Present day solutions, however, have not been effective in providing a low cost solution which is easily operated by the speaker/teacher.

One such solution is to use a calculator which has an opening in its case such that light may be transmitted through the display itself. The calculator is set upon the base of an overhead projector. Thus, the display acts as a transparency and its image may be projected to a large screen.

This approach has significant problems. First, due to the size of the calculator display, the image projected is generally too small to be comfortably viewed by the audience. Second, the base of the overhead is capable of generating significant heat, which affects the LCD display, eventually making the entire display opaque. Third, since the entire calculator sits on the base of the overhead projector, the speaker must stare into the light emitted by the base while operating the calculator.

Another approach is typically used with computers. This approach provides a liquid crystal display (LCD) pallet of about the same size as a typically transparency used on an overhead projector. The pallet is placed on the overhead projector and is driven by the computer. Because of the size of the LCD and because of the additional hardware necessary to cool the display, this alternative results in a high system cost.

Therefore, a need has arisen for a display which may be used in conjunction with an overhead projector which provides a large projected image at low cost and which is less susceptible to heat related performance degradation than prior art solutions.

SUMMARY OF THE INVENTION

In accordance with the present invention, a display demonstration system is provided for projecting calculator and computer displays onto a large screen for group viewing, which substantially eliminates or prevents the disadvantages associated with prior display devices.

The present invention provides a display which may be coupled to the computing device to receive display data from the computing device and through which light may be transmitted. A platform is operable to elevate the display to a predetermined distance from the base of the overhead projector. A lens assembly is positioned between the display and the overhead lens of the overhead projector such that an enlarged image of the display may be projected.

The present invention provides significant advantages over the prior art. First, the invention provides a low cost solution which is less susceptible to heat related performance degradation than the prior art. A larger projected image is provided by the additional lens coupled to the platform. The display may be operated from a remote location, enhancing its use in the classroom. Further, temperature compensation circuitry may be provided in the display to minimize contrast changes in the projected image. Also, a separate contrast control may be provided in the display to optimize the projected image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
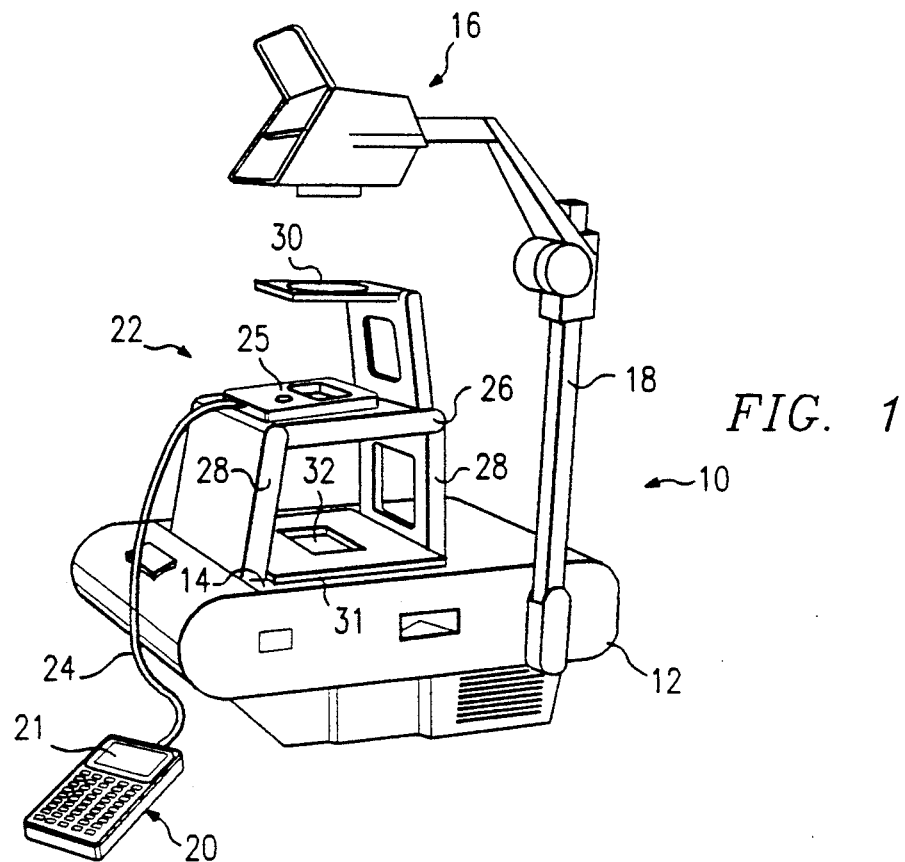
FIG. 1 illustrates a perspective view of a first embodiment of the present invention.
Figure 2:
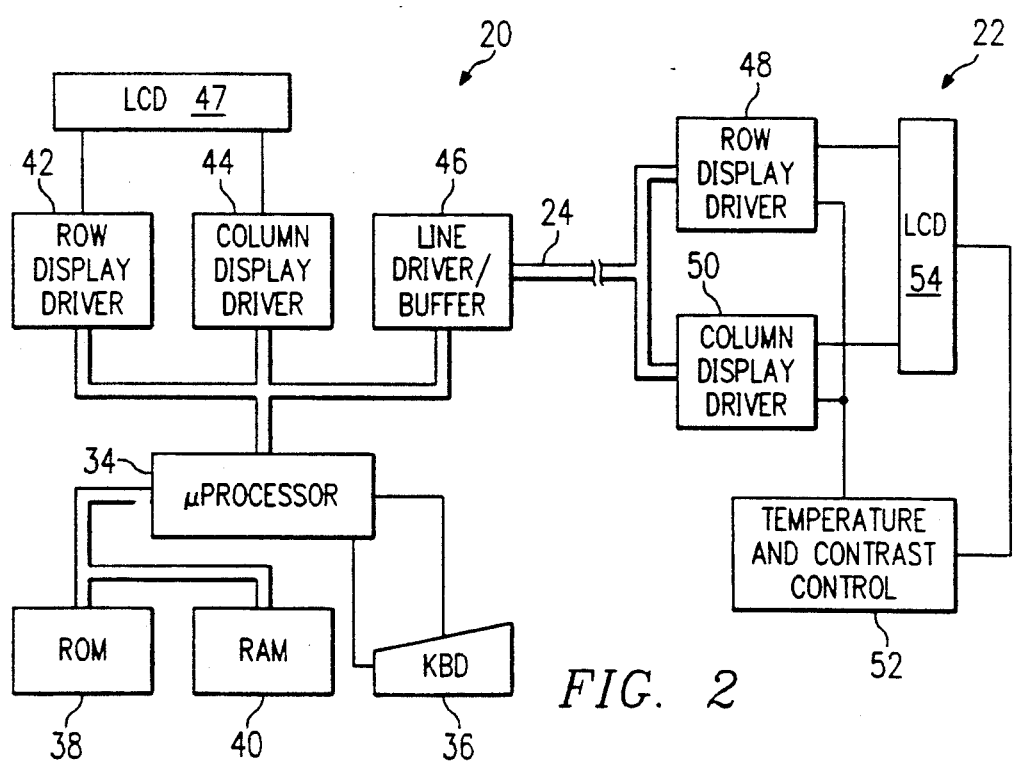
FIG. 2 illustrates a block diagram of an embodiment of the present invention using a calculating and a displaying device coupled with an electrical cable.

The preferred embodiment of the present invention is best understood by referring to FIGS. 1-2 of the drawings, like numerals being used for like and corresponding parts of the various drawings.

FIG. 1 illustrates a perspective view of the present invention. A overhead projector 10 comprises a base unit 12 which projects light upwards through a lens 14. The light is projected through the overhead lens assembly 16 which includes one or more lenses and a plurality of mirrors to project the light to a screen (not shown). The lens assembly 16 is slideably engaged on an arm 18. Overhead projectors of this type are manufactured and sold by a number of companies.

A computing device 20, shown in FIG. 1 as a calculator having a local display 21 (preferably a graphics display), is coupled to a remote display 22 by a cable 24. The remote display includes a contrast control knob 25 and is described in greater detail in connection with FIG. 2. The remote display 22 is held above the base lens 14 on a platform 26 having legs 28. A lens 30 is positioned between the remote display 22 and the overhead lens assembly 16. A heat shield 31 is placed on top of the base lens 14. The heat shield 31 is preferably a white, or light colored, foam board having a window 32 formed therein such that the display device 22 is shielded from excess heat from the base unit 12, except for the light needed to project the display. A light colored heat shield will avoid heat retention which could damage the base lens 14.

The platform 26, legs 28 and lens 30 may be provided in a single unit. A suitable unit is commercially available from the Polaroid Corporation; this unit is intended for projecting Polaroid color-graph type 691 overhead transparencies.

In operation, the remote display 22 generates the same image as is present on the computing device 20. Because the remote display 22 is elevated from the base unit 12, it is subjected to much less heat than would a display which is lying on the base lens 14. The heat shield 31 further reduces the amount of heat received by the remote display 22. The lens 30 magnifies the image of the remote display 22.

FIG. 2 illustrates a block diagram of an embodiment of the calculator 20 and display unit 22 coupled by a cable 24. The calculator 20 comprises a microprocessor 34 coupled to a keyboard 36 and to ROM and RAM memories 38 and 40, respectively. The microprocessor 34 is further coupled to a row display driver 42, a column display driver 44 and a line driver/buffer 46. The row and column display drivers 42 and 44 are connected to the LCD (or other suitable display) 47.

The line driver/buffer drives the cable 24. The cable 24 is also connected to row and column display drivers 48 and 50 of the remote display 22. The row and column display drivers 48 and 50 are coupled to a temperature and contrast control circuit 52. An LCD (or other suitable display) 54 is connected to the row and column display drivers 48 and to the temperature and contrast control circuit 52.

In the preferred embodiment, the LCDs 47 and 54 each comprise a LCD matrix, for example, a 64 row × 96 column display. The LCDs are driven by row display drivers 42 and 48 which may comprises, for example, Toshiba T7900 LCD drivers. Similarly, the display columns are driven by column display drivers 44 and 50 which may comprise Toshiba T7778A integrated circuits. Depending upon the size of the display, more than one of the LCD driver integrated circuits may be necessary.

The microprocessor circuit 34 is programmed by ROM 38 and performs the desired features of the calculator 20. The microprocessor may include a gate array to drive the display drivers.

The line driver/buffer 46 drives the signals from the microprocessor 34 over the cable 24 to the row and column display drivers 48 and 50. A cable length of ten feet has been found to be adequate for remote use of the calculator without degradation of the signals, although a longer cable could be used.

The temperature and contrast control circuitry performs two functions. First, the voltages to the LCD 54 may be adjusted by the user using a potentiometer on the remote display 22, thereby allowing the user to manually adjust the contrast of the LCD 54. The potentiometer affects the voltages generated by a resistive ladder driving the LCD 54. Further, the temperature and contrast control circuitry 52 adjusts the voltages to the LCD 54 automatically as the temperature of the remote display 22 changes. As the temperature of the display changes, the resistance provided by a thermistor located proximate the LCD 54 changes accordingly. The thermistor affects the voltages generated by the resistive ladder driving the LCD 54, and thus, controls the contrast of the LCD.

In operation, the circuit of FIG. 2 produces the same signals to both sets of display drivers. Thus, the image displayed by the LCDs 47 and 54 is always identical. The calculator 20 can be operated normally by the teacher, who views the LCD 47 on the calculator. The remote display 22 replicates the image on its LCD 54, which may be displayed to the audience. Therefore, the speaker/teacher need not face the viewgraph or the enlarged image. Accordingly, the speaker/teacher may address the audience directly while performing calculations on the calculator 20.

The present invention also solves the problems of heat degradation of the display through use of the elevated platform, the temperature compensation, and the heat shield. Thus, the present invention can be used for extended periods of time without noticeable deterioration to the enlarged image of the display.

While the present invention has been described in conjunction with a relatively low resolution calculator display, a high resolution display could be provided for use with a computer. The smaller screen size as compared to present day pallets would reduce the cost and enhance its portability. The aforementioned advantages regarding heat degradation would further reduce the cost of the display by eliminating the need for costly cooling devices.

Although the present invention has been described in detail, it should be understood that various changes, substitutions and alterations can be made herein without departing from the spirit and scope of the invention as defined by the appended claims.

What is claimed is:

1. A display demonstration system for providing an enlarged projected image of the display of an electronic data processing apparatus on a plane surface to facilitate a didactic experience for viewers of the enlarged image, said system comprising:

an electronic data processing apparatus having
a keyboard provided with a plurality of keys for selective actuation of individual keys by an operator to provide data input,
memory means for storing the data input,
a display for providing visual images representative of keyboard inputs, and
processor control means connected to said keyboard and said memory means for regulating display data provided to said display in producing an image thereon related to the data input by said keyboard;

an image projector including
a base housing having a light source disposed therein and having a top surface provided with an opening therethrough in registration with the light source,
a base lens mounted in the opening in the top surface of said base housing,
an elongated standard connected to said base housing and extending vertically above the top surface thereof in which the base lens is provided, and
a lens assembly housing connected to said elongated standard and suspended over said base housing in overhanging vertically spaced relationship with respect to the top surface of said base housing, said overhanging lens assembly housing including a projecting lens system therein in optical alignment with the base lens in the top surface of said base housing and the light source disposed in said base housing for projecting light onto a plane surface remotely located with respect to said image projector;

a heat shield plate provided on the top surface of said base housing of said image projector, said heat shield plate having a window therethrough in registration with the base lens in the top surface of said base housing and the light source disposed in said base housing;

platform means disposed on the top surface of said base housing of said image projector in the space between said base housing and said overhanging lens assembly housing, said platform means including an elevated surface thereon vertically spaced above the top surface of said base housing and vertically spaced below said overhanging lens assembly housing, said elevated surface of said platform means defining a support transparent to light;

a remote display unit adapted to be received on the transparent support defined by the elevated surface of said platform means, said remote display unit including a light-transmissive remote display disposable in optical alignment with the window in said heat shield plate, the base lens in said base housing, and the light source within said base housing;

said remote display unit having means for regulating the contrast of the image and background content to be provided on said remote display; and an electrical cable connecting said electronic data processing apparatus and said remote display unit;

the display of said electronic data processing apparatus acting as a source display and the remote display of said remote display unit acting as a target display such that said remote display provides a replicated image of the image appearing on the display of said electronic data processing apparatus in response to data processing operation initiated by data inputs via said keyboard;

whereby an enlarged image of the display of the electronic data processing apparatus is projected from said remote display by the lens system within the overhanging lens assembly housing of said image projector onto a remote plane surface for viewing.

2. A display demonstration system as set forth in claim 1, further including a magnifying lens mounted on said platform means and disposed above the transparent support defined by the elevated surface of said platform means, said magnifying lens being in optical alignment with the window in said heat shield plate, the base lens in said base housing and the light source within said base housing, and said magnifying lens being positionable between said remote display unit and said lens system within said overhanging lens assembly housing of said image projector in spaced optical alignment therewith.

3. A display demonstration system as set forth in claim 1, wherein said remote display is a liquid crystal display.

4. A display demonstration system as set forth in claim 3, wherein said means of said remote display unit for regulating the contrast of the image and background content to be provided on said remote display comprises:

manual means for adjusting the voltages applied to the liquid crystal display for user adjustment, and automatic means responsive to the temperature of said liquid crystal display for regulating the voltages applied thereto.

5. A display demonstration system as set forth in claim 1, wherein said source display as provided by the display of said electronic data processing apparatus and said target display as provided by the remote display of said remote display unit respectively comprise a matrix of individual display pixels arranged in a plurality of rows and columns;

source row and column display drivers connected to said source display and said processor control means of said electronic data processing apparatus; and target row and column display drivers connected to said target display provided by the remote display of said remote display unit;

whereby the display data provided to the individual display pixels of said source display provided by the display of said electronic data processing apparatus as controlled by said processor control means are provided to said target row and column display drivers of said target display provided by the remote display of said remote display unit with corresponding pixels of said target display receiving the same display data as the pixels of said source display such that the remote display of said remote display unit replicates an image thereon identical to the image on the source display provided by the display of said electronic data processing apparatus.

6. A display demonstration system as set forth in claim 5, wherein said source and target displays are liquid crystal displays.

7. A display demonstration system as set forth in claim 6, wherein said means of said remote display unit for regulating the contrast of the image and background content to be provided on said remote display serving as the target display comprises:

manual means for adjusting the voltages applied to the display pixels of said liquid crystal target display; and automatic means responsive to the temperature of the display pixels of said liquid crystal target display for regulating the voltages applied to the display pixels of said liquid crystal target display.

8. A display demonstration system as set forth in claim 7, wherein said electronic data processing apparatus is a calculator.

* * * * *